Sept. 9, 1958    R. E. HARRINGTON    2,851,238
AGRICULTURAL IMPLEMENT-MOUNTING MEANS
Filed Sept. 15, 1955    2 Sheets-Sheet 1

*INVENTOR.*
R. E. HARRINGTON

Sept. 9, 1958  R. E. HARRINGTON  2,851,238
AGRICULTURAL IMPLEMENT-MOUNTING MEANS
Filed Sept. 15, 1955  2 Sheets-Sheet 2

INVENTOR.
R. E. HARRINGTON

United States Patent Office 2,851,238
Patented Sept. 9, 1958

2,851,238

AGRICULTURAL IMPLEMENT-MOUNTING MEANS

Roy E. Harrington, Moline, Ill., assignor, by mesne assignments, to Deere & Company, a corporation of Illinois Application September 15, 1955, Serial No. 534,477

14 Claims. (Cl. 248—226)

This invention relates to means for mounting an implement on an agricultural tractor or other equivalent mobile support.

The invention finds practical utility in that type of mounting in which the tractor includes a transverse support, which may be its own rear axle housing or some other part thereof, and implements of various types have especially designed brackets for embracing such support. The desirable features of such mounting means include initial low cost, speed and ease in operation, and adaptability thereof to variations in the support or encircling means itself because of manufacturing tolerances. It is also desirable that the mounting means have the ability to raise or otherwise pre-position the implement to insure adequate seating of the cooperating members.

According to the present invention, these and other features are accomplished by the provision of support-encircling structure including a base member in the form of an inverted L, opposite ends of which are interconnected by toggle means selectively lockable and releasable to mount and dismount the implement. A principal object of the invention relates to lever means included in the toggle means and effective to act about a fulcrum for pre-positioning or seating the base member. Still another object of the invention resides in improved toggle means in which the actuating lever includes an extensible and retractable handle, one purpose of which is to increase the available lever arm when necessary and another purpose of which is to serve as part of cooperative lock means for securing the toggle against release. A still further feature of the invention resides in its particular adaptability for use with a tractor axle structure or equivalent support having generally a square shape.

The foregoing and other important objects and desirable features inherent in and encompassed by the invention will become apparent as a preferred embodiment of the invention is disclosed in detail in the ensuing specification and accompanying sheets of drawings, the several figures of which will be described immediately below.

Figure 1:
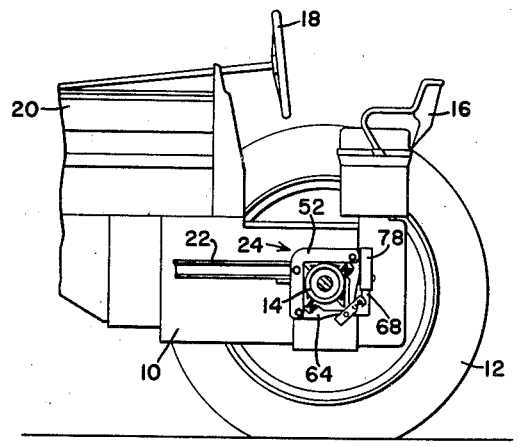
Fig. 1 is a side elevational view of the rear portion of a tractor, the near wheel having been omitted to expose the axle and mounting structure therefor.
Figure 2:
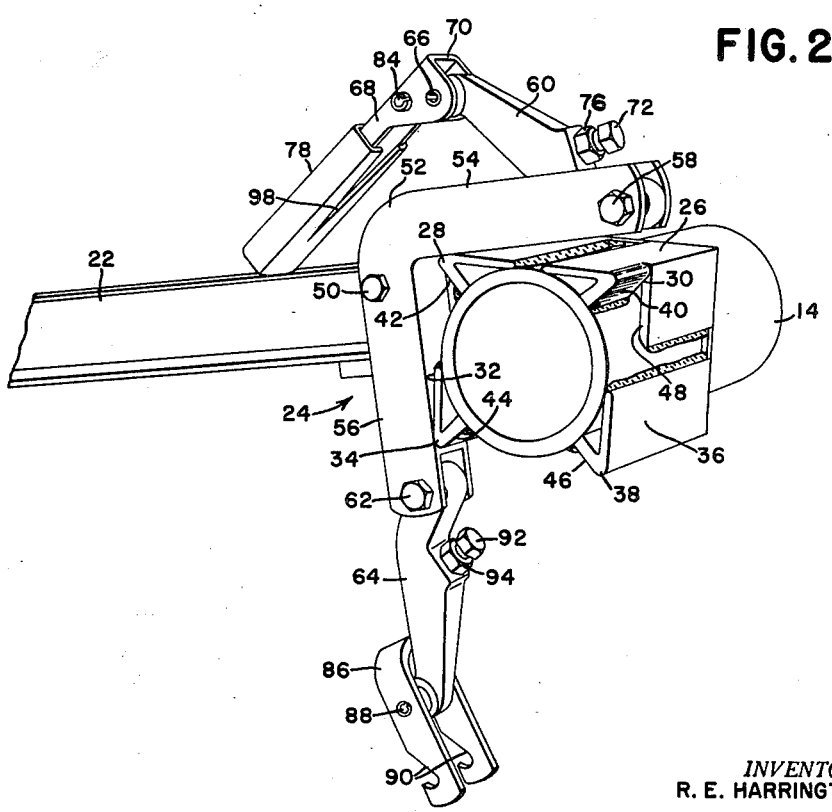
Fig. 2 is an enlarged perspective showing the initial stage in positioning the base member of the structure.

In Fig. 1 will be recognized the rear portion of a typical agricultural tractor having a main fore-and-aft body 10 carried on a pair of transversely spaced traction wheels, only one of which is shown at 12, which traction wheels are connected to the body 10 by transversely extending supports in the form of axle housings, only one of which appears at 14. The body has a typical operator's seat 16 ahead of which is a steering wheel 18 and the rear portion of engine hood structure 20. It should be noted that here, as well as in the claims, such expressions as "front," "rear," "top," "bottom," etc. are used only in the interests of convenience and clarity and are not intended to import into the invention limitations not otherwise required.

A frame member 22 is selected as representative of one of many types of implements that can be mounted on the tractor. In the particular instance, the frame member is shown as extending forwardly of the rear axle housing or support 14, but the direction of projection is immaterial. The frame member is mountable on and demountable from the axle housing by means of releasable encircling-structure designated in its entirety by the numeral 24.

As best seen in Figs. 2 through 5, the support or axle housing 14 has an outer end portion generally in the form of a square, which shape is afforded by a top portion or face 26 having transverse front and rear edges 28 and 30, respectively; a depending front face or portion 32 having a transverse bottom edge 34; and a rear portion or face 36 which terminates in a transverse bottom edge 38. The means 24 may be reversibly mounted on the axle structure just described. For this purpose, the rear edge portion 30 is in the form of a rib having a rear radial face or part 40 and the front edge is in the form of a rib having a radial front face 42. In addition, the front and rear bottom edges 34 and 38 respectively have radial parts 44 and 46, the part 44 facing predominantly to the rear and the part 46 facing predominantly to the front. The particular configuration is also useful in the mounting of implements by means of attaching devices other than that shown. As respects the present device, the configuration of the axle housing includes an offset at 48 which gauges the mounting device lengthwise of the axle housing 20, as will be clear from the further description. In the particular illustration utilized here, the implement frame member 22 is secured to the mounting means 24 as by a removable bolt or pin 50; although, this detail is without specific significance here. The riblike structures 28, 30, 34 and 38 may be secured by welding to the tubular housing 14; however, this particular detail is not important, except that it represents one way in which the support may be achieved.

The encircling means 24 comprises, first, a base member 52 having first and second or top and front legs 54 and 56, respectively. The legs 54 and 56 are integrally united or otherwise rigidly constructed so as to extend approximately normal to each other in the form of an inverted L. The rear or free end of the horizontal top leg 54 is provided with a transverse pivot at 58 by means of which pivotal connection is effected to a first link 60. The lower or free end of the front leg 56 has a transverse pivot at 62 by means of which a pivotal connection is effected to a second link 64. The pivots 58 and 62 are transverse; stated otherwise, they are parallel to each other but normal to the general plane of the L-shaped member 52. The length of the link 60 is substantially equal to that of the front leg 56, and the length of the link 64 is substantially equal to that of the top leg 54.

Figure 5:
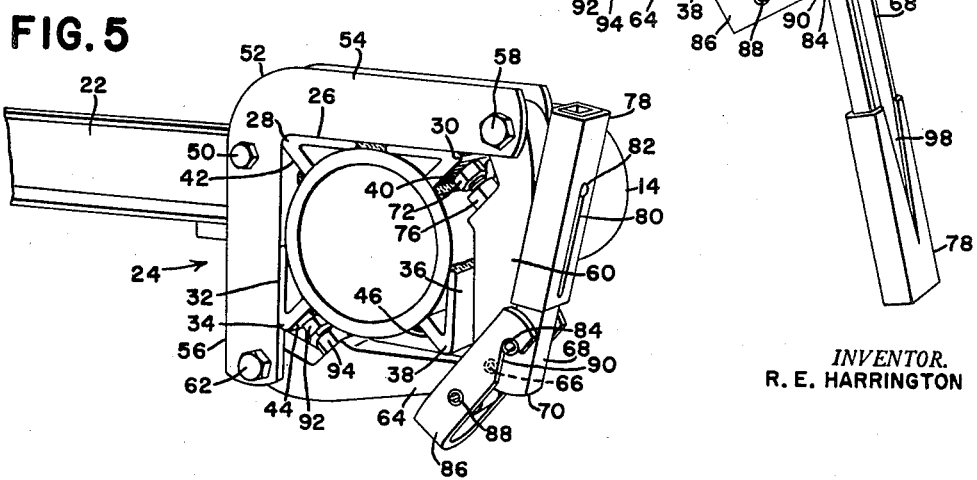
Fig. 5 shows the final stage in the mounting procedure.

The link 60 has a pivotal connection at 66 with a lever 68. This lever is operative as an extension of the link 60 (Fig. 3) and is movable to a folded position alongside the link (Fig. 5). When the lever 68 is in its extended position (Fig. 3) it operates through one-way stop means as means for increasing the available lever arm so that the link 60 and lever 68 are movable as one in a downward and forward direction. The one-way stop means is afforded by the transverse portion 70 of the lever 68, which is here of U-shape cross section, and the portion 70 engages the under portion of the link 60, as will be obvious.

Figure 3:
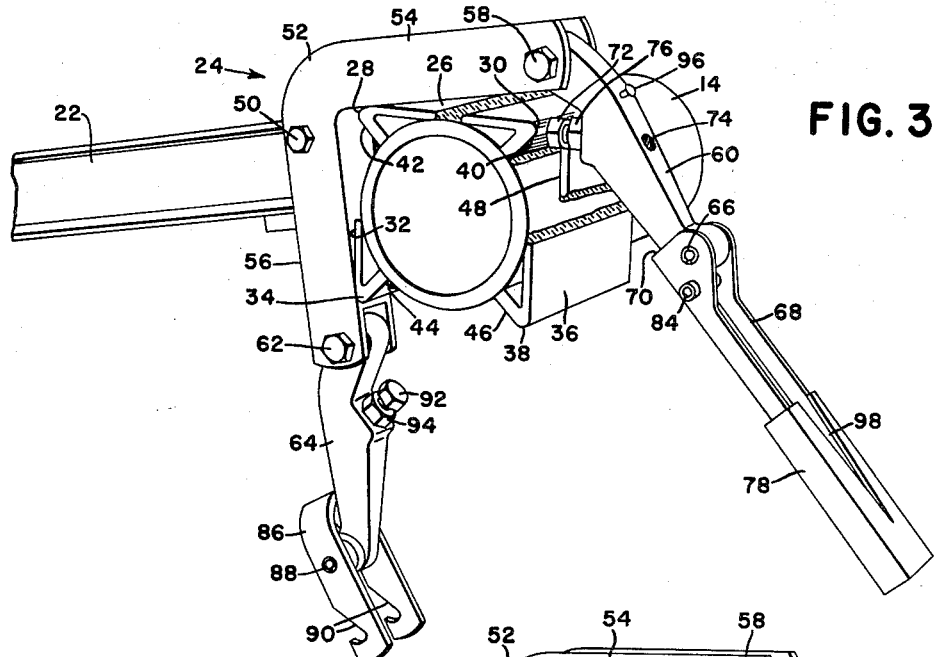
Fig. 3 is a perspective showing the second stage in the operation of encircling the support.
Figure 4:
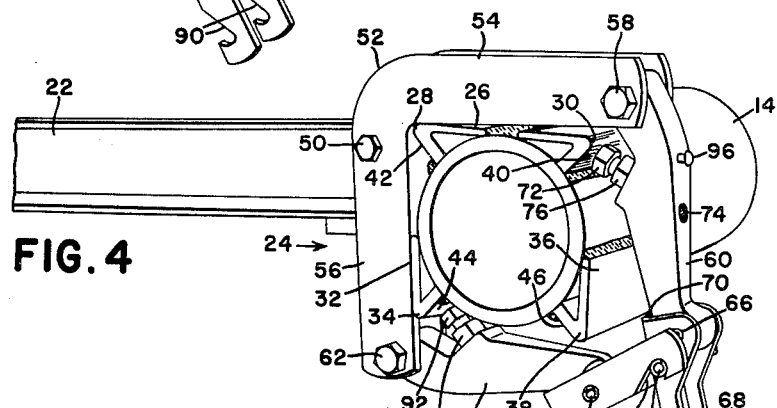
Fig. 4 shows the next stage, just before the toggle mechanism is actuated to complete the clamping action.

The importance of the one-way stop means at 70 will be appreciated from Fig. 3 and the following explanation. In that figure, it will be noted that the under edge of the top leg 54 is not seated on the top support portion 26; nor is the rear edge of the front leg 56 seated against the front portion 32 of the support. This results, in most cases, from a difference in the localized elevations of the tractor and implement, which may occur, for example, if the implement has been standing for quite some time and has sunk somewhat into the ground, in which case it may become necessary to manually lift the mounting means 24 and frame member 22 so that the top leg 54 can rest on the support portion 26 adjacent its front edge 28. However, proper seating of the components involved is accomplished by use of the link 60 as a lever, which is implemented by the extension afforded by the lever 68 which has its edge portion 70 engageable with the under portion of the link 60. To further accomplish the seating and locating function of the available lever arm, which acts about the pivot 58, the link 60 has thereon a fulcrum element in the form of an adjustable headed screw 72, the link being tapped at 74 to receive the screw and a lock nut 76 being provided to secure the proper adjustment. When the parts are in the positions shown in Fig. 3, the fulcrum afforded by the head of the screw 72 engages the rib or rear edge 30 of the support portion 26. Manual downward and forward depression of the lever arm 60—68 causes the exertion of a rearward and downward rocking force on the means 24, whereupon the legs 54 and 56 will accommodate themselves to the support portions 26 and 32 (Fig. 4). To further augment the lever arm available, the lever 68 is equipped with a sliding handle 78, which is shown in its extended position in Figs. 3 and 4 and in its retracted or shortened position in Figs. 2 and 5, as well as in Fig. 1. Limitation on movement of the handle 78 relative to the lever 68 is accomplished by a slot 80 in the handle and a pin 82 in the lever. This structure is best shown in Fig. 5.

The lever 68 has therein a transverse pin 84 which is spaced radially as respects the pivot 66. When the lever 68 is extended (Fig. 3) the pin 84 is beyond the pivot 66; however, when the link is folded (Fig. 5) the pin 84 is short of the pivot 66. This relative difference in position is important in effecting the toggle or clamping action in connection with the link 64 and a third link 86, which third link is pivoted to the free end of the link 64 by a pivotal connection at 88. The link 86 is preferably in the form of a U, shaped so that its bight crosses the underside of the link 64 and prevents complete rotation of the link 86 relative to the link 84, whereby the position of the link 86 prior to connection, as between Fig. 3 and 4, is one that facilitates hooking of rear hooked portions 90 of the link on the pin 84 of the lever 68.

The axle embracing and clamping function of the means 24 is improved by the provision on the link 64 of a fulcrum element in the form of a headed screw 92 which is received by a tapped bore (not shown) in the link 64. The position of the screw, after adjustment, is secured by a lock nut 94. The fulcrum element afforded by the screw 92 engages behind the surface or part 44 of the lower rib or edge 34, as when the parts are brought together in the position of Fig. 4. The hooks 90 of the link 86 are hooked over the pin 84 in the extended lever 68. The operator then swings the lever 68 upwardly and forwardly, the pivot 84 passing over the pivot 66 and ahead thereof so that a straight line drawn between the pivots 84 and 86 is ahead of the pivot 66, thus effecting an over-center lock. If the fulcrum elements or screws 72 and 92 are properly adjusted, the means 24 will tightly embrace the axle housing and will be held against movement relative thereto. In this position of the parts, the offset at 48 engages the far side of the link 60 to prevent axial shifting in that direction and to serve in the first place as locating means insuring proper positioning of the means 24 relative to a similar means (not shown) used at the opposite side of the tractor.

Although the sliding handle 78, when extended, is of importance in giving the operator the greatest mechanical advantage consistant with clamping the means 24, it will be seen that the handle, if allowed to remain extended, would project in such position relative to the operator's seat 63 that the operator, in mounting and dismounting the tractor, might contact the lever and dislocate it from its locked position. Accordingly, the handle is mounted slidably on the lever 68 so that it may be moved to a retracted or shortened position. The ability of the handle to move to its shortened position is taken advantage of to achieve means for positively locking the means 24 against inadvertent release. For this purpose, the link 60 and handle 68 include cooperative lock members or elements. Specifically, the link 60 has projecting from the rear or back edge thereof a headed member 96 and the handle 78 has on its front side (when closed) a tapered slot 98. When the preliminary hookup is completed as shown in Fig. 4 and the lever 68, with the handle 78 extended, is swung upwardly, the lever 68 is proximate to or lies alongside the link 60. Because of the U-shaped section of the lever 68, the lever actually straddles or accommodates the link. Then, when the handle 78 is moved downwardly to the position of Fig. 5, the slot 98 receives the headed member 96 and the parts cannot be dislocated until the handle 78 is first moved upwardly. The limit on the movement of the handle 78 is established, as aforesaid, by the limit means comprising the handle slot 80 and the pin 82 in the lever 68.

When it is desired to release the mounting means 24 from the support or axle housing 14, the handle 78 is first moved upwardly to release the pin 96 from the slot 98, after which the lever 68, as elongated by the handle 78, may be swung rearwardly and downwardly to the position of Fig. 4, whereupon the link 86 may be unhooked from the pin 84 and the linkage 64—86 allowed to drop to the position of Fig. 3. The linkage 60—68 may then be lifted and moved forwardly to the position of Fig. 2. Appropriate supports are placed under the implement, if the implement does not have its own support, and the tractor may now be backed away from the implement. Remounting is just as easily accomplished by reversing the procedure just described.

It will be noted that the fulcrum or axle-housing-engaging members 72 and 92 are located at the extreme diagonally opposite corners of the axle and are therefore a maximum distance apart for the given size of axle housing used. This affords the maximum moment arm in resisting twisting of the structure about the axle housing axis by vertical forces applied to the implement frame 22. Another feature of the structure is the relatively great mechanical advantage available not only to the operator in mounting and dismounting the assembly but also in the rentention of the assembly when mounted. That is to say, the distance between the pivot 58 and fulcrum 72 is materially less than that between the pivots 58 and 66. The same relationship exists between the pivot 62, fulcrum 92 and pivot 88. In both cases, the relatively long lever arms 72—66 and 92—88 require a comparatively small force applied through the link 86 and handle 68 to exert a considerably greater force at 72 and 92.

It is deemed that the operative characteristics of the structure are clear from the foregoing description, from which it will also be clear that the advantages first pointed out herein are accomplished in a novel and inventive manner. Other features of the invention not categorically enumerated will undoubtedly occur to those versed in the art, as will many modifications and alterations in the preferred structure disclosed, all of which may be achieved without departing from the spirit and scope of the invention.

What is claimed is:

1. An implement mounting clamp of the character described for use in encircling a support, comprising: an L-shaped member having first and second rigidly united legs arranged normal to each other, each leg having a free end and each free end having a pivot transverse to the plane of the L; a first link connected by the respective pivot to the free end of the first leg and having a length substantially equal to that of the second leg, said first link having at its free end a pivot parallel to the aforesaid pivots; a second link connected by the other pivot to the free end of the second leg and having a length substantially equal to that of the first leg, said second link having at its free end a pivot parallel to the aforesaid pivots; a lever connected to the pivot at the free end of the first link and swingable from an extended position to a folded position relative to said first link, said lever having thereon a pin spaced beyond the pivot at the free end of said first link when said lever is in its extended position and spaced short of said pivot when said lever is in its folded position; a third link connected to the pivot at the free end of the second link and adapted to receive the pin on the lever when the lever is extended whereby when the lever is moved to its folded position the first and second links are brought together as a clamp about the support; and a handle carried by the lever for sliding lengthwise of said lever between a first position in which it serves as an extension of said lever and a second position of retraction relative to said lever.

2. The invention defined in claim 1, in which: the relationship between the pivot of the lever to the first link, the pivot of the third link to the second link and the pin on the lever is such that the pin passes over-center as respects said pivots when the lever is in its folded position.

3. The invention defined in claim 1, in which: the handle has a lock member thereon proximate to the first link in the folded position of the lever, and the first link has a cooperative lock element thereon engageable with and disengageable from the handle lock member respectively upon retraction and extension of the handle while the lever is in its folded position.

4. The invention defined in claim 1, in which: the first link and lever have cooperable one-way stop portions interengageable when the lever is in its extended position so that the first link and lever move as one in one direction about the pivot at the free end of the first leg.

5. The invention defined in claim 1, in which: the first link has an inwardly extending, adjustable, support-engaging fulcrum adjacent to its pivot to the free end of the first leg.

6. The invention defined in claim 1, in which: the second link has an inwardly extending, adjustable support-engaging fulcrum adjacent to its pivot to the free end of the second leg.

7. An implement mounting clamp of the character described for use in encircling a support, comprising: a base member having first and second rigidly united leg portions projecting away from each other to embrace part of the support, each leg having a free end and each free end having a pivot transverse to the plane of the member; a first link connected by the respective pivot to the free end of the first leg, said first link having at its free end a pivot parallel to the aforesaid pivots; a second link connected by the other pivot to the free end of the second leg, said second link having at its free end a pivot parallel to the aforesaid pivots; said base member and links substantially completely embracing the support when the free ends of the links are proximate to each other; a lever connected to the pivot at the free end of the first link and swingable from an extended position to a folded position relative to said first link, said lever having thereon a pin spaced beyond the pivot at the free end of said first link when said lever is in its extended position and spaced short of said pivot when said lever is in its folded position; a third link connected to the pivot at the free end of the second link and adapted to receive the pin on the lever when the lever is extended whereby when the lever is moved to its folded position the first and second links are brought together as a clamp about the support; and a handle carried by the lever for movement relative to said lever between a first position in which it serves as an extension of said lever and a second position of retraction relative to said lever.

8. The invention defined in claim 7, in which: the handle has a lock member thereon proximate to the first link in the folded position of the lever, and the first link has a cooperative lock element thereon engageable with and disengageable from the handle lock member respectively upon retraction and extension of the handle while the lever is in its folded position.

9. The invention defined in claim 7, in which: the first link and lever have cooperable one-way stop portions inter-enageable when the lever is in its extended position so that the first link and lever move as one in one direction about the pivot at the free end of the first leg.

10. In combination with a transverse horizontal support having a top portion including front and rear transverse edges and a front portion depending from the front edge to a transverse bottom edge, a support-encircling clamp, comprising: a base member of inverted L-shape having a horizontal top leg extending rearwardly over the top portion of the support to a rear end adjacent to the rear edge of the support, and a vertical front leg depending from the front of the top leg ahead of the support front portion and having a lower end adjacent to said bottom edge; a link pivoted on a transverse axis to the rear end of the top leg for downward swinging, said link having a fulcrum element thereon engaging behind the support rear edge so that depression of the link exerts a rearward and downward force on the base member to cause the legs to seat respectively on the support portions; and releasable means connectible between the lower end of the front leg and the downwardly swung link to hold said link against upward movement.

11. The invention defined in claim 10, in which: the fulcrum element is adjustable to vary its distance from the transverse pivot axis of the link.

12. The invention defined in claim 10, in which: the bottom edge of the front support portion comprises a rib-like means having a rear face part; and the releasable means includes a second link pivoted on a transverse axis to the lower end of the front leg for upward and rearward swinging, and said second link has thereon a fulcrum element engageable with said rear face part so that upward swinging of said second link exerts a rearward force on said front leg.

13. A support-encircling device of the character described, comprising: generally C-shaped means for partially embracing the support and having first and second spaced apart ends; toggle means connected to one of said ends and connectible to the other of said ends to complete the embracement of the support, said toggle means including a toggle-actuating lever connected to the toggle means and movable between first and second positions respectively away from and adjacent to said device to respectively loosen and tighten the toggle; and a handle movable bodily with the lever to increase the mechanical advantage for moving said lever between its first and second positions and said handle being also selectively positionable relative to the lever while the lever is in either position, said handle having a lock element and one of said means having a cooperative lock element and said elements being lockable and releasable by selective positioning of the handle relative to the lever when the lever is in its second position.

14. The invention defined in claim 13, in which: the handle is slidable on the lever between extended and retracted positions for respectively increasing and decreasing the length of the available lever arm; the locking element on said one means includes a headed member; and the locking element on the handle includes a slot in said handle for receiving the headed member when the lever is first moved to its second position with the handle extended and the handle is then retracted to decrease the length of said lever arm.

References Cited in the file of this patent

UNITED STATES PATENTS

| | | |
|---|---|---|
| 573,637 | Barlow | Dec. 22, 1896 |
| 1,518,479 | Brewer | Dec. 9, 1924 |
| 1,547,543 | Welty | July 28, 1925 |
| 2,047,506 | Hertel | July 14, 1936 |
| 2,066,148 | Heiber | Dec. 29, 1936 |
| 2,361,362 | Altgelt | Oct. 31, 1944 |
| 2,557,202 | Raymond | June 19, 1951 |